United States Patent [19]
Woodson et al.

[11] Patent Number: 5,299,424
[45] Date of Patent: Apr. 5, 1994

[54] AQUARIUM HEATER AND COOLER

[76] Inventors: Dennis W. Woodson, 5819 Cliffmont, San Antonio, Tex. 78250; Richard L. Miller, 12 Parkside Dr., Dix Hills, N.Y. 11746-4879

[21] Appl. No.: 993,435
[22] Filed: Dec. 21, 1992
[51] Int. Cl.$^5$ ............................................. F25B 21/02
[52] U.S. Cl. ........................................ 62/3.7; 62/3.3; 119/245; 119/262; 119/229
[58] Field of Search ................. 62/3.2, 3.3, 3.7, 3.64; 119/3, 5, 245, 262, 229

[56] References Cited
U.S. PATENT DOCUMENTS 3,254,494 6/1966 Chartouni .......................... 62/3.3
4,151,810 5/1979 Wiggins ................................ 119/5
4,867,102 9/1989 Turano ................................ 62/3.2

Primary Examiner—John M. Sollecito
Attorney, Agent, or Firm—Richard L. Miller

[57] ABSTRACT

A combination aquarium heater and cooler apparatus is provided which utilizes a feedback circuit to automatically maintain the fluid in an ecosystem at an operator set desired temperature. The feedback system scheme takes advantage of a thermo-electric heat pump component in combination with a high gain amplifier in order to achieve the desired result of maintaining the ecosystem at a temperature which is nearly constant regardless of other undesirable spurious heat inputs or losses to the ecosystem.

6 Claims, 2 Drawing Sheets

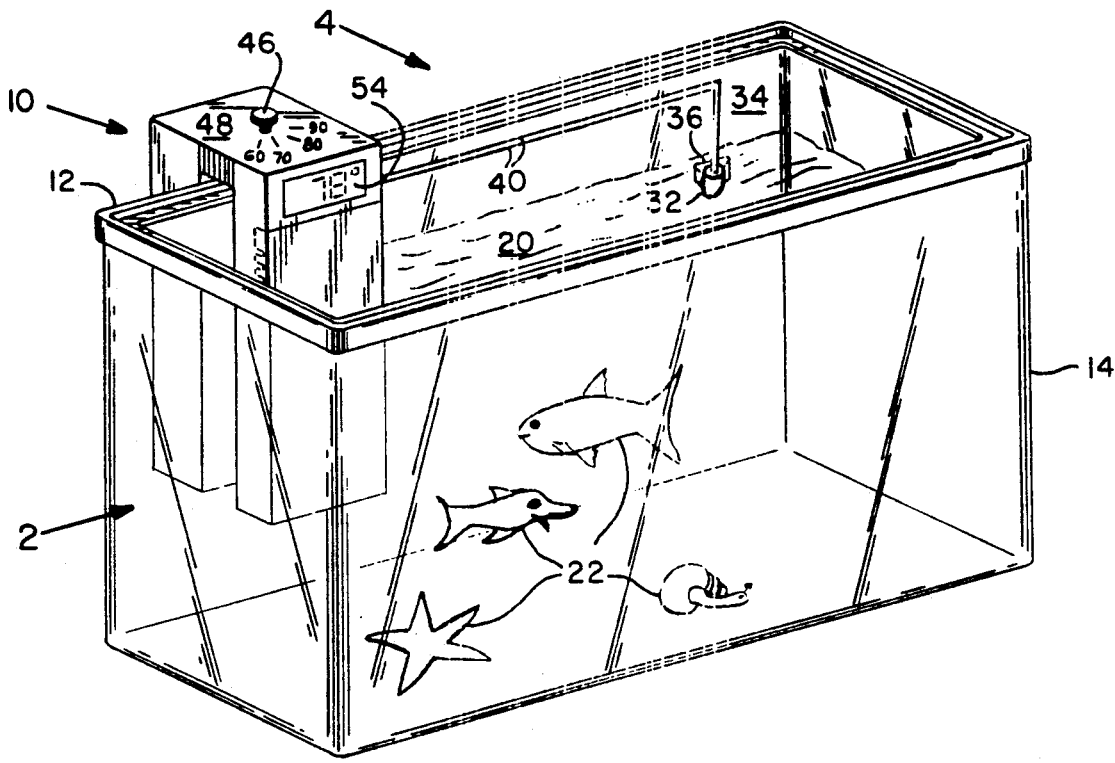
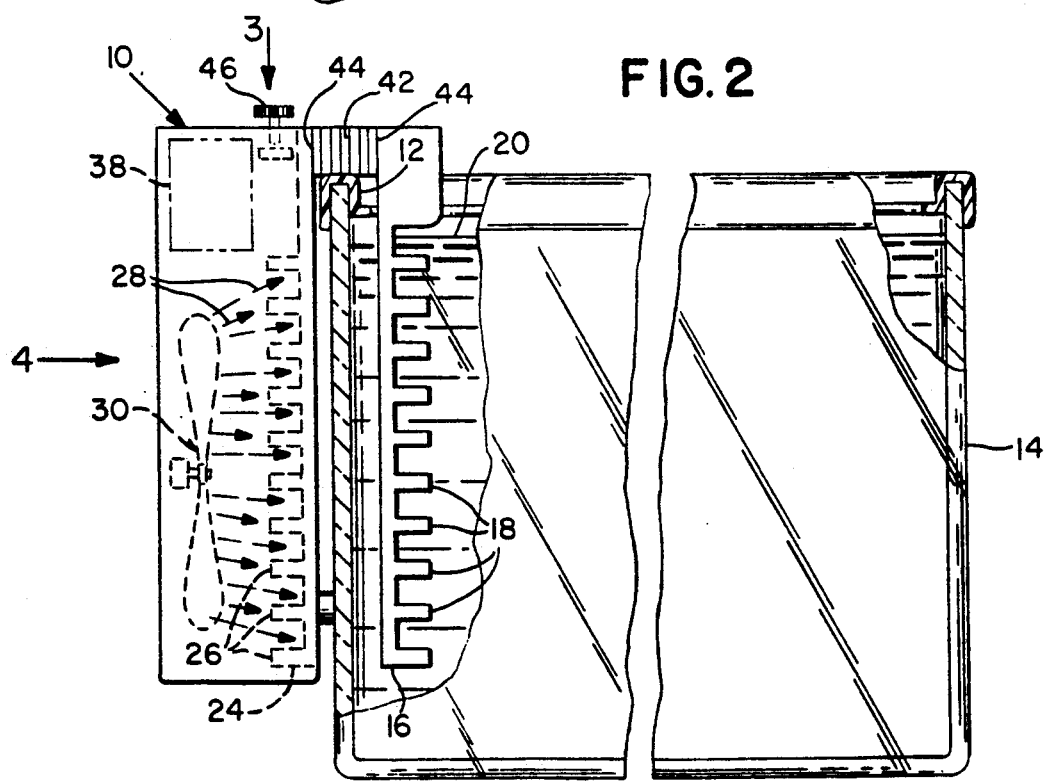

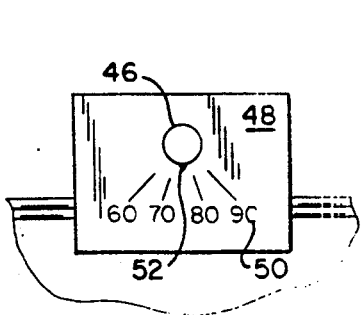
FIG. 3
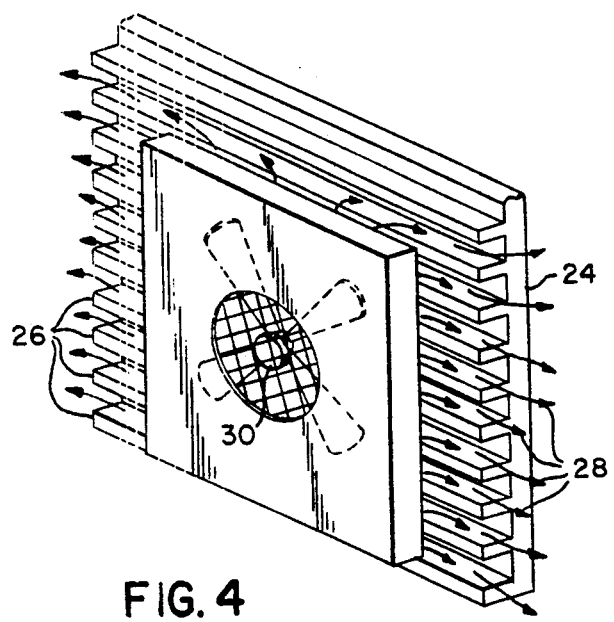
FIG. 4
FIG. 5
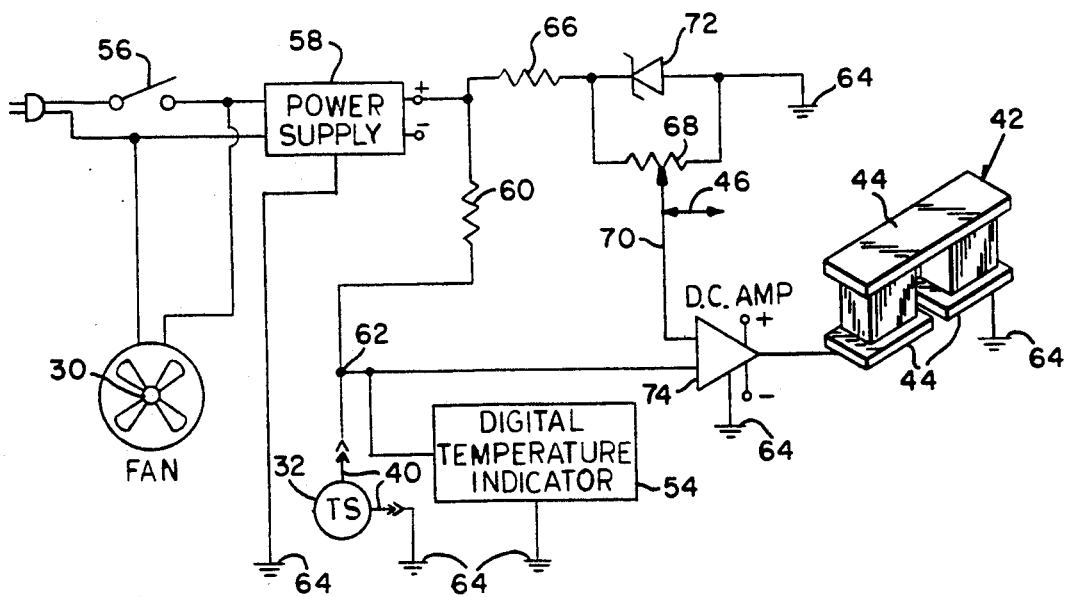

AQUARIUM HEATER AND COOLER

BACKGROUND OF THE INVENTION

The instant invention relates generally to immersible temperature controller apparatus and more specifically it relates to an immersible device for automatically supplying heating or cooling energy to the water of an aquarium as is required by the ecosystem contained therein so as to maintain a constant temperature independent of the surrounding ambient air temperature.

Numerous aquarium temperature controllers have been provided in the prior art that are adapted to modify the temperature of an aquarium from that of the surrounding ambient air temperature. For example, U.S. Pat. Nos. 4,313,048 to Holbrook; 4,378,488 to Jager and 4,876,102 to Turano all are illustrative of such prior art. While these units may be suitable for the particular purpose to which they address, they would not be as suitable for the purpose of the present invention as hereafter described.

SUMMARY OF THE INVENTION

A primary object of the present invention is to provide an aquarium heater and cooler that will overcome the shortcomings of the prior art devices.

Another object is to provide a combination aquarium heater and cooler apparatus that automatically supplies the required amount of heating or cooling energy to maintain the fluid in an aquarium ecosystem at a desired almost constant temperature independent of the fluctuating ambient temperature of the surrounding air.

An additional object is to provide a combination aquarium heater and cooler apparatus that utilizes a thermo-electric device which operates using the Peltier effect to supply heat or absorb heat in order to maintain a desired temperature of the aquarium ecosystem.

A further object is to provide a combination aquarium heater and cooler apparatus that is simple and easy to use.

A still further object is to provide a combination aquarium heater and cooler apparatus that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that may be made in the specific construction illustrated and described within the scope of the appended claims.

BRIEF DESCRIPTION OF THE DRAWING FIGURES

The Figures in the drawings are briefly described as follows:

FIG. 1 is a perspective view of a fish tank illustrating the instant invention installed thereon;

FIG. 2 is a diagrammatic elevational view taken in the direction of arrow 2 in FIG. 1 with parts broken away;

FIG. 3 is a diagrammatic elevational view taken in the direction of arrow 3 in FIG. 2 with parts broken away;

FIG. 4 is a diagrammatic perspective view with parts broken away, taken generally in the direction of arrow 4 in FIG. 2; and FIG. 5 is a block diagram of the circuitry of the instant invention.

DETAILED DESCRIPTION OF THE PREFERRED EMBODIMENTS

Turning now descriptively to the drawings, in which like reference characters denote like elements throughout the several views, FIGS. 1 and 2 best illustrate the combination aquarium heater and cooler apparatus 10 mounted on the edge 12 of an aquarium tank 14. The combination aquarium heater and cooler apparatus 10 has a first heat exchanger 16 having a plurality of fins 18 immersed in the fluid 20 typically water of the ecosystem 22 maintained within the aquarium tank 14. A remote temperature sensing element 32 is immersed in the fluid 20 and secured to a surface 34 of the aquarium tank 14, by any of a variety of well known mechanisms, typically suction cup, mating hook and loop pile fasteners or waterproof cement 36, and is electrically connected by conductors 40 to appropriate circuitry 38 housed within the apparatus 10.

FIGS. 2 and 3 best illustrate a second heat exchanger 24 which has a plurality of fins 26 located outside the aquarium tank and are in the direct path of an ambient air stream 28 created by a fan unit assembly 30 which constantly blows air over the fins 26 in order to increase the rate at which heat may be exchanged between this heat exchanger 24 and the ambient air 28.

A thermo-electric heat pump component 42 acting in accordance with the Peltier effect, for which there are available numerous commercial devices, is mounted with its thermal input and output ports 44 each in intimate contact with a surface of the first heat exchanger 16 and the second heat exchanger 24 so that heat energy can be supplied to or absorbed from the fluid 20 of the ecosystem 22 and the ambient air 28 as a particular situation may require.

As best illustrated in FIGS. 1 and 3, a temperature setting control knob 46 is located on a top surface 48 of the apparatus 10. A scale 50 indicating the desired ecosystem fluid temperature is shown located in radial alignment with a pointer 52 on this knob 46. Alternatively, a digital read out device (not shown), could be incorporated to display the desired ecosystem fluid temperature. A digital numeric display device 54 is shown indicating the actual ecosystem fluid temperature.

A block diagram, FIG. 5, illustrates the overall scheme of how the components of the combination aquarium heater and cooler apparatus 10 cooperate with each other in order to achieve the automatic result of maintaining the ecosystem's fluid temperature at a constant set temperature desired by the operator of the system.

When the system is activated by closing a power switch 56, typically conventional house current is supplied to the fan unit assembly 30, as previously explained, and also to a D.C. power supply 58, which produces power to operate the analog circuitry which ultimately drives the heat pump component 42. The temperature sensing element 32 is supplied voltage through an appropriate first dropping resistor 60, and accordingly when the temperature of the fluid 20 changes, there is a one to one change in the voltage value of node 62 with respect to overall circuit ground 64. A second dropping resistor 66, in series with an appropriate Zener diode 72 is utilized to establish a constant voltage value across a potentiometer 68 which is used by the operator to set a voltage at node 70, with respect to ground 64, which corresponds with the value of the desired ecosystem's fluid temperature.

The differential value between the voltage produced by the temperature sensing element at node 62 and the voltage set at node 70 is used as the input for the D.C. Amplifier 74 in order drive the heat pump element's electrical input, either negative or positive, with respect to ground 64 so that heat energy will accordingly be either transferred to or from the ecosystem's fluid depending obviously upon whether the ambient temperature is above or below that of the ecosystem's temperature.

Because the system continuously monitors itself due to the feedback arrangement of the overall scheme of the components, as the temperature of the system approaches the desired set value of temperature, the difference between the voltages of node 62 and 70 becomes very small. If the values of the components of the system are appropriately chosen and the gain of the D.C. amplifier 74 is sufficiently high, the desired temperature of the ecosystem's fluid 20 can be maintained within less than one degree Fahrenheit of fluctuation for a wide degree of every day normal fluctuation in ambient air temperature above and below the desired ecosystem's temperature, and other temperature inputs such as radiant energy from the sun, fireplaces etcetera.

Accordingly, delicate plants, animals and other creatures can be well maintained even though the system is located in an ambient air environment subject to relatively large changes in temperature.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A combination aquarium heater and cooler apparatus which comprises:
   a) a first heat exchanger for immersion in a fluid of an ecosystem contained in said aquarium;
   b) a second heat exchanger for location in an ambient air outside said aquarium;
   c) a heat pump component having thermal input and output ports each in intimate contact with a surface of the first heat exchanger and the second heat exchanger said heat pump component comprises a thermo-electric device which produces a cooling effect when an operating current flows there in one direction and a heating effect when the operating current flows therein in an opposite direction, thereby supplying heat or absorbing heat from said fluid in order to maintain the temperature of said ecosystem nearly constant; and
   d) automatic circuit means responsive to the temperature difference between the fluid of the ecosystem and a desired operator set temperature connected to the thermo-electric device for determining the direction of the operating current supplied thereto according to said temperature difference, whereby heat is appropriately pumped into or out of said fluid to maintain said fluid at a temperature which is substantially the same as the desired operator set temperature
   e) wherein said first and second heat exchangers comprise elongated bodies extending spaced apart, in side by side relation and joined at adjacent upper longitudinal ends by the heat pump component thereby forming an inverted U-shaped structure conforming approximately to the dimensions of a perimeter wall of said aquarium, with the heat pump resting on an upper edge of said perimeter wall which extends between the two heat exchangers which consequently are located respectively within and without said aquarium.

2. A combination aquarium heater and cooler apparatus as recited in claim 1, wherein said thermo-electric device operates using the Peltier effect.

3. A combination aquarium heater and cooler apparatus as recited in claim 2, wherein means for adjusting said desired operator set temperature is a potentiometer.

4. A combination aquarium heater and cooler apparatus as recited in claim 3, wherein means for sensing the actual temperature of said fluid is a temperature sensing element which is remotely located in said ecosystem, immersed in said fluid and is electrically connected to said automatic circuit means.

5. A combination aquarium heater and cooler apparatus as recited in claim 4, wherein said automatic circuit means further comprises a differential amplifier having a first input coupled to said potentiometer, a second input coupled to a temperature sensor and an output connected to the electrical input of said thermo-electric device and wherein the polarity of said output is determined by the relative magnitudes of its two inputs, whereby when the temperature sensed is greater than the desired temperature, said thermo-electric device will absorb heat from said fluid and when the temperature sensed is less than the desired temperature, said thermo-electric device will supply heat to said fluid.

6. A combination aquarium heater and cooler apparatus as recited in claim 5, wherein said automatic circuit means further comprises a fan unit assembly which constantly blows air over said second heat exchanger in order to increase the rate at which heat may be exchanged between said heat exchanger and the ambient air.

* * * * *